United States Patent
Pal et al.

(10) Patent No.: US 9,890,764 B2
(45) Date of Patent: Feb. 13, 2018

(54) TRAILING EDGE CAP FOR A ROTOR BLADE AND METHOD OF MANUFACTURING SAME

(71) Applicant: General Electric Company, Schenectady, NY (US)

(72) Inventors: Sujan Kumar Pal, Bangalore (IN); Wilfred A. A. W., Bangalore (IN)

(73) Assignee: General Electric Company, Schenectady, NY (US)

( * ) Notice: Subject to any disclaimer, the term of this patent is extended or adjusted under 35 U.S.C. 154(b) by 465 days.

(21) Appl. No.: 14/225,965

(22) Filed: Mar. 26, 2014

(65) Prior Publication Data
US 2015/0275855 A1    Oct. 1, 2015

(51) Int. Cl.
| | |
|---|---|
| *B29C 43/14* | (2006.01) |
| *F03D 1/06* | (2006.01) |
| *B29C 43/06* | (2006.01) |
| *B29D 99/00* | (2010.01) |
| *F03D 13/10* | (2016.01) |
| *F03D 3/06* | (2006.01) |

(52) U.S. Cl.
CPC ............ *F03D 1/0675* (2013.01); *B29C 43/06* (2013.01); *B29D 99/0025* (2013.01); *F03D 13/10* (2016.05); *Y02E 10/721* (2013.01); *Y02P 70/523* (2015.11)

(58) Field of Classification Search
CPC .... F03D 1/0675; F03D 1/0633; F03D 1/0641; F03D 1/0658; B29C 2043/3621; B29C 45/0003; B64C 2003/147; B64C 27/467; B20C 2043/142; B20C 2043/144; B29D 99/0025; B29D 99/0028
See application file for complete search history.

(56) References Cited

U.S. PATENT DOCUMENTS

| | | | |
|---|---|---|---|
| 5,088,665 A | * | 2/1992 | Vijgen .................... B64C 23/06 244/198 |
| 7,637,721 B2 | | 12/2009 | Driver et al. |
| 8,043,066 B2 | | 10/2011 | Sambamurty |
| 8,506,250 B2 | | 8/2013 | Bagepalli et al. |

(Continued)

FOREIGN PATENT DOCUMENTS

| | | | | |
|---|---|---|---|---|
| DE | 102010026588 A1 | * | 1/2012 | ........... F03D 1/0641 |
| GB | 880425 A | * | 10/1961 | ........... B64C 27/473 |
| WO | WO-8905718 A1 | * | 6/1989 | ............. B29C 43/08 |

OTHER PUBLICATIONS

Machine translation of German Patent Publication No. DE 102010026588 A1, originally published Jan. 12, 2012, 15 pages.*

*Primary Examiner* — William P Bell
(74) *Attorney, Agent, or Firm* — Dority & Manning, P.A.

(57) ABSTRACT

A trailing edge protective cap for a rotor blade of a wind turbine and method of manufacturing same is disclosed. The method includes infusing a first material onto a first mold so as to form a first part having a length. While the first part is still in the first mold, the method may also include placing a second mold onto the first part. The method may then include infusing a second material onto the second mold and at least a portion of the first part so as to form a second part having a length. The first and second parts may then be joined or infused together along a portion their respective lengths so as to form the protective cap, wherein the protective cap includes a joined section and an open section.

9 Claims, 4 Drawing Sheets

(56) References Cited

U.S. PATENT DOCUMENTS

| | | | | |
|---|---|---|---|---|
| 8,550,777 B2* | 10/2013 | Kildegaard | ............ | F03D 1/065 |
| | | | | 416/62 |
| 8,888,453 B2* | 11/2014 | Fuglsang | ............ | F03D 1/0641 |
| | | | | 416/1 |
| 2005/0042109 A1* | 2/2005 | Kovalsky | ............ | B29C 70/222 |
| | | | | 416/230 |
| 2007/0020104 A1* | 1/2007 | Moffitt | ............ | B64C 3/14 |
| | | | | 416/223 R |
| 2012/0134817 A1* | 5/2012 | Bagepalli | ............ | F03D 1/0675 |
| | | | | 416/62 |
| 2012/0141269 A1* | 6/2012 | Giguere | ............ | F03D 1/0633 |
| | | | | 416/1 |
| 2012/0313291 A1* | 12/2012 | Stege | ............ | B29C 70/74 |
| | | | | 264/259 |
| 2013/0129519 A1 | 5/2013 | Nielsen et al. | | |
| 2013/0323070 A1* | 12/2013 | Grabau | ............ | F03D 1/0675 |
| | | | | 416/229 R |
| 2015/0300317 A1* | 10/2015 | Altmikus | ............ | F03D 1/0633 |
| | | | | 416/235 |

* cited by examiner

TRAILING EDGE CAP FOR A ROTOR BLADE AND METHOD OF MANUFACTURING SAME

FIELD OF THE INVENTION

The present subject matter relates generally to rotor blades for a wind turbine and, more particularly, to a trailing edge cap for a rotor blade a method of manufacturing same.

BACKGROUND OF THE INVENTION

Wind power is considered one of the cleanest, most environmentally friendly energy sources presently available, and wind turbines have gained increased attention in this regard. A modern wind turbine typically includes a tower, a generator, a nacelle, and one or more rotor blades. The rotor blades capture kinetic energy of the wind using known airfoil principles. The rotor blades transmit the kinetic energy in the form of rotational energy so as to turn a shaft coupling the rotor blades directly or indirectly to the generator. The generator then converts the mechanical energy to electrical energy that may be deployed to a utility grid.

The rotor blades generally include a blade root, a blade tip, and a blade shell extending between the blade root and blade tip. The blade shell generally defines an aerodynamic airfoil shape of the rotor blade and may be formed from a fiber-reinforced material, such as glass fiber, carbon fiber, or the like. Additionally, the blade shell is typically a composite design, being manufactured from separate shell components which are bonded together. To bond the shell components, a thick layer of adhesive is typically applied to one or both of the shell components. The shell components are then brought into contact with one another (e.g., by placing the shell components on top of each other) to form a thick adhesive bond line around the edge of the blade shell (i.e., the leading and trailing edges of the rotor blade).

A particularly sensitive area of the rotor blade is the trailing edge due to the relatively sharp edge created by the joint of the pressure and suction sides. Further, bothersome noise may be generated by the wind turbine due to the interaction between boundary layer air and the trailing edge.

Accordingly, there is a need for an improved trailing edge protective cap for wind turbine rotor blades that address the aforementioned issues. More specifically, a trailing edge protective cap that protects the blunt trailing edge, reduces operation noise, and also captures more annual energy production (AEP) would be welcomed in the art, as well as a method of manufacturing same.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for manufacturing a trailing edge protective cap for a rotor blade of a wind turbine. The method includes infusing a first material onto a first mold so as to form a first part having a length. While the first part is still in the first mold, the method may also include placing a second mold onto at least a portion of the first part. The method may then include infusing a second material onto the second mold and a portion of the first part so as to form a second part having a length. The first and second parts may then be joined together along a portion their respective lengths so as to form the protective cap, wherein the protective cap comprises a joined section and an open section.

In one embodiment, the open section may include a first leg and a second leg extending at opposite, diverging angles from an apex. As such, the first leg is configured to engage a pressure side of the rotor blade and the second leg is configured to engage a suction side of the rotor blade. Further, the open section is configured to protect the trailing edge of the rotor blade when installed on the rotor blade. In a further embodiment, the joined section may include an extension member having a length. The extension member may be configured to extend from the apex beyond a trailing edge of the rotor blade. Further, the extension member may extend in a direction that generally aligns with one of the pressure side or suction side of the rotor blade. In another embodiment, the extension member may have a solid cross-section along its length.

In additional embodiments, the first mold may include a flat mold having any suitable cross-section. For example, in one embodiment, the flat mold may have a rectangular cross-section or similar. Similarly, in a further embodiment, the second mold may include an angled mold having any suitable cross-section. For example, in one embodiment, the angled mold may have a triangular cross-section or similar. In another embodiment, the method may include aligning a maximum height of the second, angled mold with an end of the first mold, wherein a height of the angled mold tapers towards a center of the first mold. In still a further embodiment, the joined section and the open section of the trailing edge protective cap may have a Y-shaped cross-section.

In yet another embodiment, the step of joining the first and second parts together along a portion of their respective lengths may further include at least one of plastic-welding or infusing the first and second parts together.

In another aspect, the present subject matter is directed to a method for manufacturing a trailing edge protective cap for a rotor blade of a wind turbine. The method includes infusing a first material onto a mold having a flat section and an angled section so as to form a first part comprising a length. The method may also include infusing a second material onto the mold so as to form a second part having a length, the second part and the first part being substantially identical. A next step includes joining the first and second parts together along a portion their respective lengths so as to form the trailing edge protective cap, wherein the protective cap has a joined section and an open section.

In one embodiment, the method may include removing the first part from the mold before infusing the second material. In a further embodiment, the open section may include a first leg and a second leg extending at opposite, diverging angles from an apex. Further, the first leg may be configured to engage a pressure side of the rotor blade and the second leg may be configured to engage a suction side of the rotor blade. As such, the open section is configured to protect the trailing edge of the rotor blade when installed on the rotor blade.

In a further embodiment, the flat section of the mold may have any suitable cross-section. For example, in one embodiment, the flat section of the mold may have a rectangular cross-section or similar. Similarly, in a further embodiment, the angled section of the mold may have any suitable cross-section. For example, in a particular embodiment, the angled mold may include a triangular cross-section or similar.

In still another embodiment, the joined section may include an extension member having a length. The extension member may be configured to extend from the apex beyond a trailing edge of the rotor blade. Further, the extension member may extend in a direction substantially parallel to the chord-wise direction. In addition, the extension member may include a solid cross-section along its length. In still a further embodiment, the joined section and the open section of the trailing edge protective cap may have a Y-shaped cross-section.

In yet another embodiment, the step of joining the first and second parts together along a portion of their respective lengths may further include at least one of plastic-welding or infusing the first and second parts together.

In still another aspect, the present subject matter is directed to a trailing edge protective cap for a rotor blade of a wind turbine. The trailing edge protective cap may include a first leg, a second leg, and an extension member, each having a length. The first and second legs are configured to engage a pressure side and a suction side of the rotor blade, respectively. Further, the first and second legs extend at opposite diverging angles from an apex. The extension member extends from the apex in a chord-wise direction beyond a trailing edge of the rotor blade. Further, the extension member includes a continuous, homogenous material defining a solid cross-section along its entire length.

In one embodiment, the trailing edge protective cap includes a Y-shaped cross-section. In another embodiment, the first and second legs each have a surface area, wherein the surface areas are configured to cover a portion of a pressure side and a suction side of the rotor blade, respectively. In a further embodiment, the trailing edge protective cap may be constructed of any suitable plastic, e.g. a fiberglass reinforced plastic or similar.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a trailing edge protective cap for a rotor blade of a wind turbine and a method for manufacturing same. The method of manufacturing the protective cap is quick, simple, and economical over previous methods known in the art. For example, in one embodiment, the method includes infusing a first material onto a first mold so as to form a first part. While the first part is still on the first mold, the method may include placing a second mold onto the first part. The method may then include infusing a second material onto the second mold and the first part so as to form a second part. The first and second parts may then be infused together along a portion their respective lengths to form a single-piece protective cap.

The protective cap as described herein is configured to fit over at least a portion of a trailing edge of the rotor blade. More specifically, the cap includes a first leg and a second leg joined together at an apex and an extension member extending from the apex. The first leg engages the pressure side of the rotor blade, whereas the second leg engages the suction side of the rotor blade. Further, the extension member extends beyond the trailing edge of the rotor blade and includes a continuous, homogenous material defining a solid cross-section along its entire length. As such, the trailing edge protective cap is configured to protect the trailing edge of the rotor blade during operation while also increasing the AEP of the wind turbine.

The protective cap of the present subject matter provides numerous advantages not present in the prior art. For example, the method of manufacturing the protective cap as described herein utilizes an infusion process that is quick, simple, and inexpensive and manufactures the cap as a single part. Further, the cap captures more AEP by extending the chord of the rotor blade. In addition, the cap is secured to the pressure side and/or suction side of the rotor blade, rather than directly to the trailing edge of the rotor blade, thereby providing more secure contact with the blade while also reducing damage to the trailing edge. Additionally, the cap is configured to reduce noise caused by the blunt trailing edge, while also providing protection to the edge. Still further advantages include a cap that is configured to be utilized in new and existing wind turbines.

Figure 1:
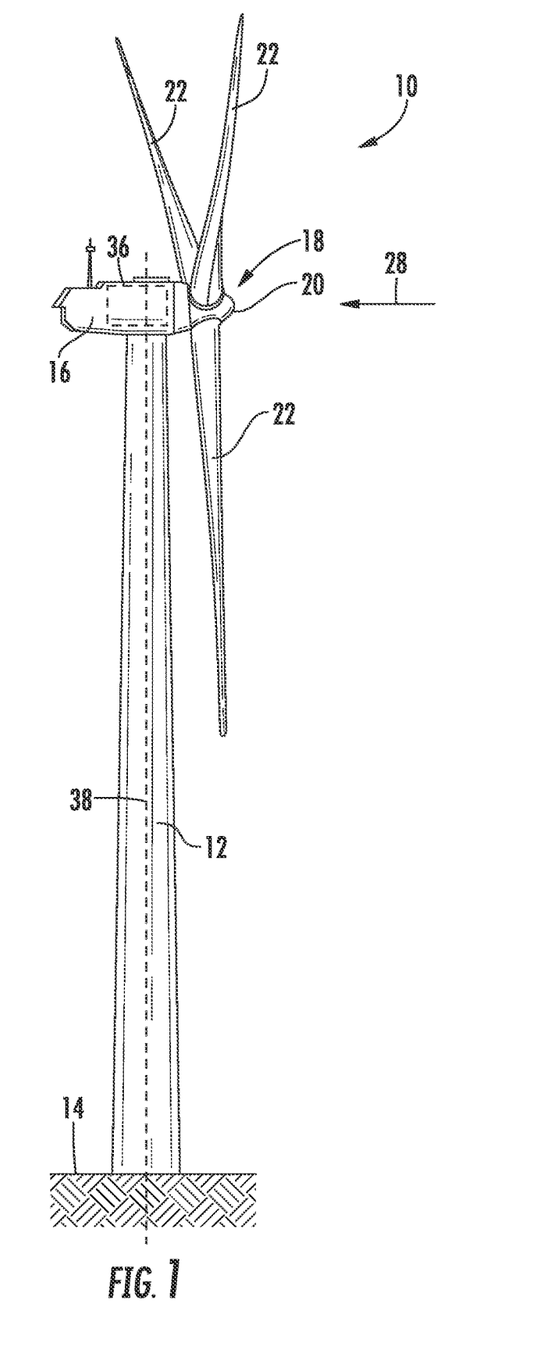
FIG. 1 illustrates a perspective view of a wind turbine according to the present disclosure.

Referring now to the drawings, FIG. 1 illustrates a perspective view of a wind turbine 10. As shown, the wind turbine 10 is a horizontal-axis wind turbine. However, it should be appreciated that the wind turbine 10 may be a vertical-axis wind turbine. In the illustrated embodiment, the wind turbine 10 includes a tower 12 that extends from a support surface 14, a nacelle 16 mounted on the tower 12, and a rotor 18 that is coupled to the nacelle 16. The rotor 18 includes a rotatable hub 20 and at least one rotor blade 22 coupled to and extending outwardly from the hub 20. As shown, the rotor 18 includes three rotor blades 22. However, in an alternative embodiment, the rotor 18 may include more or less than three rotor blades 22. Additionally, in the illustrated embodiment, the tower 12 is fabricated from tubular steel to define a cavity (not illustrated) between the support surface 14 and the nacelle 16. However, in an alternative embodiment, the tower 12 may be any suitable type of tower known in the art.

The rotor blades 22 may generally have any suitable length that enables the wind turbine 10 to function as described herein. For example, in one embodiment, the rotor blades 22 may have a length ranging from about 15 meters (m) to about 91 m. However, other non-limiting examples of blade lengths may include 10 m or less, 20 m, 37 m or a length that is greater than 91 m. Additionally, the rotor blades 22 may be spaced about the hub 20 to facilitate rotating the rotor 18 to enable kinetic energy to be transferred from the wind into usable mechanical energy, and subsequently, electrical energy. Specifically, the hub 20 may be rotatably coupled to an electric generator (not illustrated) positioned within the nacelle 16 to permit electrical energy to be produced.

As shown in the illustrated embodiment, the wind turbine 10 may also include a turbine control system or turbine controller 36 centralized within the nacelle 16. However, it should be appreciated that the controller 36 may be disposed at any location on or in the wind turbine 10, at any location on the support surface 14 or at any other suitable location. Generally, the controller 36 may be configured to control the various operating modes of the wind turbine 10 (e.g., start-up or shut-down sequences). Additionally, the controller 36 may control many of the various components of a wind turbine 10. For example, as the direction 28 of the wind changes, the controller 36 may be configured to control a yaw direction of the nacelle 16 about a yaw axis 38 to position the rotor blades 22 with respect to the direction 28 of the wind. In particular, the controller 36 may control a yaw drive mechanism (not illustrated) of the nacelle 16 in order to rotate the nacelle 16 about the yaw axis 38.

Figure 2:
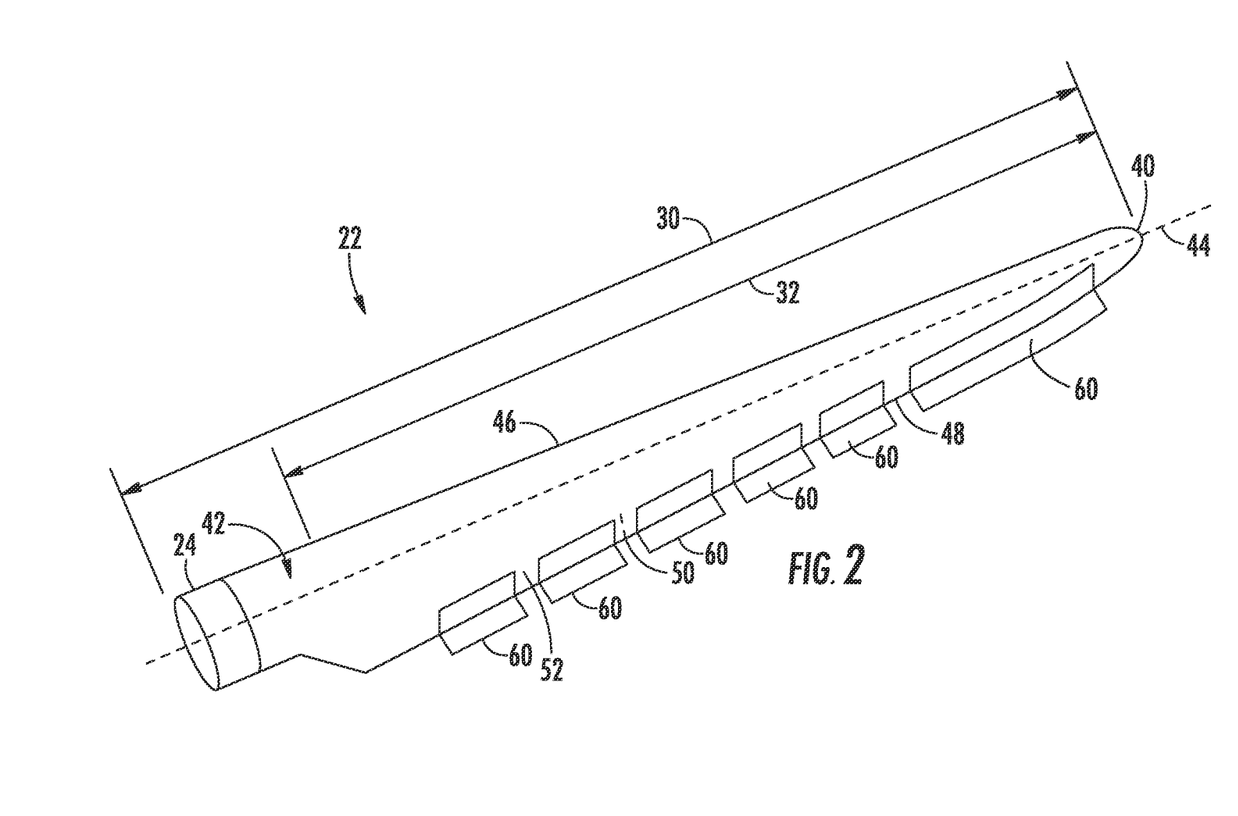
FIG. 2 illustrates a perspective view of a rotor blade of a wind turbine according to the present disclosure.

Referring now to FIG. 2, a perspective view of a rotor blade 22 is illustrated. As shown, the rotor blade 22 includes a blade root 24 used to mount the rotor blade 22 to the hub 20 (FIG. 1). The rotor blade 22 also includes a blade tip 40 disposed opposite the blade root 24. A blade shell 42 generally extends along a central axis 44 between the blade root 24 and the blade tip 40 and defines a leading edge 46 and a trailing edge 48 of the rotor blade 22. In one embodiment, the blade shell 42 of the rotor bade 22 may be manufactured as a two-piece construction, including a suction side 50 and a pressure side 52. It should be appreciated that each pressure and suction side 50, 52 may generally define a substantially aerodynamic profile. Thus, when combined, the pressure and suction sides 50, 52 form a blade shell 42 having an aerodynamic airfoil shape that enables the rotor blade 22 to capture kinetic energy from the wind using known airfoil principles.

As shown, the rotor blade 22 includes at least one trailing edge protective cap 60 secured over at least a portion of the trailing edge 48 of the rotor blade 22. More specifically, the rotor blade 22 may include one or more trailing edge protective caps 60 employed along the span 30 of the rotor blade 22 at any location along the span-wise length 32 of the trailing edge 48. For example, as illustrated in FIG. 2, five trailing edge protective caps 60 having a shorter longitudinal length L and one trailing edge protective cap 60 having a longer longitudinal length L are disposed along the span-wise length 32 of the trailing edge 48 so as to protect substantially the entire trailing edge 48. Further, the trailing edge protective cap(s) 60 may be installed adjacent to one another or may be spaced apart a predetermined distance from one another. In alternative embodiments, the trailing edge protective cap 60 may be a single trailing edge protective cap 60 having a longitudinal length L extending substantially the entire span-wise length 32 of the trailing edge 48. As used herein, the term "span-wise" is meant to encompass the direction along the span 30 of the rotor blade 22, whereas the term "chord-wise" is meant to encompass the direction along the chord 26 of the rotor blade 22.

Figure 3:
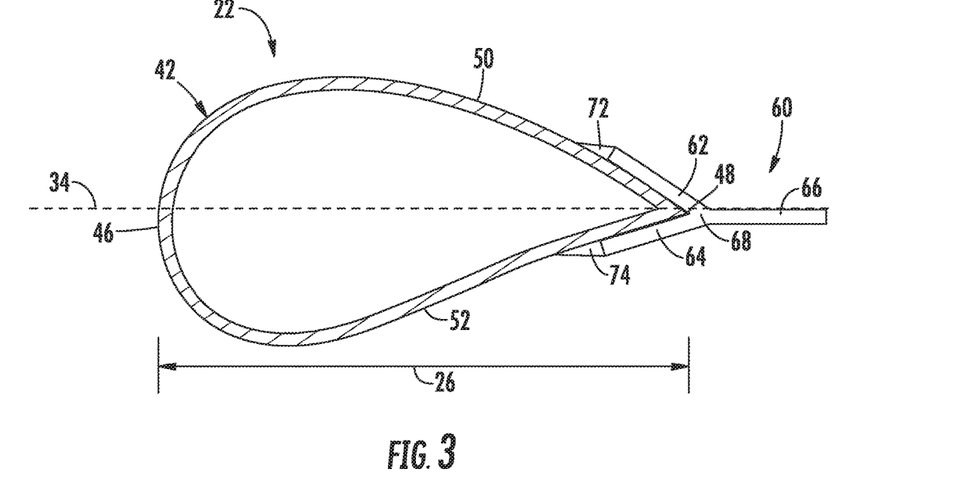
FIG. 3 illustrates a cross-sectional view of a rotor blade having a trailing edge protective cap installed thereon according to the present disclosure.
Figure 4:
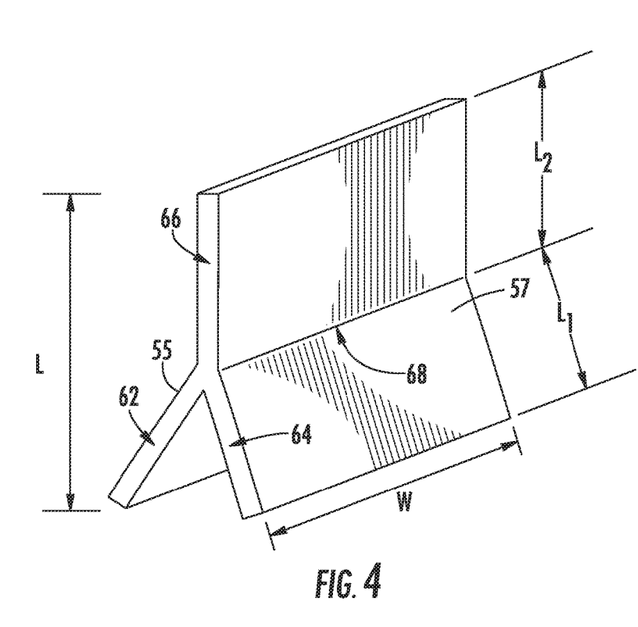
FIG. 4 illustrates a perspective view of a trailing edge protective cap according to the present disclosure.

Referring particularly to FIGS. 3 and 4, the trailing edge protective cap(s) 60 may include a first leg 62, a second leg 64, and an extension member 66 extending from an apex 68. As shown, the first leg 62 engages the pressure side 50 of the rotor blade 22 and the second leg 64 engages the suction side 52 of the rotor blade 22. Further, the extension member 66 may extend beyond trailing edge 48 of the rotor blade 22 so as to extend a chord 26 of the rotor blade 22. In addition, the trailing edge 60 cap is configured to protect the trailing edge 48 of the rotor blade 22 during operation of the wind turbine 10. Further, the extension member 66 includes a continuous, homogenous material defining a solid cross-section along its entire length. For example, in one embodiment as will be discussed later, the protective cap 60 may be manufactured by infusion-molding first and second parts 86, 88 along a portion of their lengths so as to define the extension member 66. Thus, the infusion process of the parts 86, 88 forms the continuous, homogenous, and solid cross-section of the extension member 66.

In various embodiments, the first and second legs 62, 64 may extend at opposite, diverging angles from the apex 68. As such, the first and second legs 62, 64 may be designed according to the shape of the pressure and suction sides 50, 52 such that they fit closely against the respective sides 50, 52 when installed. Accordingly, the trailing edge protective cap 60 does not add substantial bulk to the rotor blade when installed on the suction and pressure sides 50, 52 of the rotor blade 22, respectively. In addition, if needed, the first and second legs 62, 64 may include tapered ends 72, 74 configured to provide a smooth transition from the suction and pressure sides 50, 52 to the trailing edge protective cap 60. As such, the tapered ends 72, 74 maintain the aerodynamic profile of the body shell 42.

Figure 5:
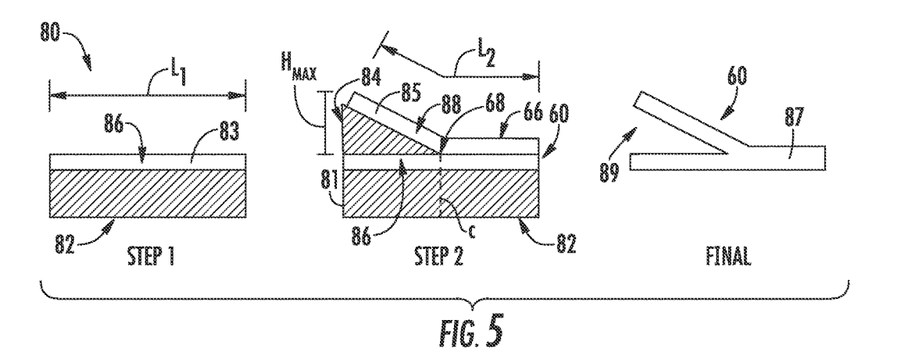
FIG. 5 illustrates one embodiment of a process for manufacturing a trailing edge protective cap according to the present disclosure; and, FIG. 6 illustrates another embodiment of a process for manufacturing a trailing edge protective cap according to the present disclosure.

Still referring to FIGS. 3 and 4, the trailing edge protective cap(s) 60 may include a Y-shape cross-section. For example, as shown in FIG. 3, the extension member 66 may extend substantially parallel to the chord-wise direction 34 of the rotor blade 22. In further embodiments, the trailing edge protective cap 60 may extend at an angle from the chord-wise direction 34 of the rotor blade 22. For example, as shown in FIG. 5, the extension member 66 of the manufactured cap 60 is configured to extend at an angle from the chord-wise direction 34 when installed on the rotor blade 22. More specifically, the extension member 66 may extend in a direction that generally aligns with one of the pressure side 50 or the suction side 22 of the rotor blade 22. In alternative embodiments, the trailing edge protective cap 60 may include any other suitable cross-section in addition to a Y-shaped cross-section.

Referring particularly to FIG. 4, the first and second legs 62, 64 may have any suitable surface areas 55, 57. The surface areas 55, 57 are configured to cover a portion of the suction and pressure sides 50, 52, respectively. For example, as shown, the first and second legs 62, 64 have substantially rectangular surface areas defined by length $L_1$ and width W. Further, the respective surface areas 55, 57 may each be substantially the same shape or may have different shapes. For example, as illustrated, both of the first and second legs 62, 64 have corresponding rectangular surface areas 55, 57.

In alternative embodiments, the surface areas 55, 57 of the first and second legs 62, 64 may be any asymmetrical shapes and/or sizes.

In further embodiments, the length $L_1$ of the first and second legs 62, 64 may extend approximately 5% to approximately 50% of the chord 26 of the rotor blade 22 as measured from the trailing edge 48 when installed. In still further embodiments, the length $L_1$ of the first and second legs 62, 64 may extend less than 5% or more than 50% of the chord 26. As shown the illustrated embodiment of FIG. 4, the length $L_1$ is approximately 10% of the chord 26 as measured from the trailing edge 48.

Similarly, the extension portion 66 may have a length $L_2$ that extends any suitable distance beyond the trailing edge 48 of the rotor blade 22 so as to extend the chord 25 of the rotor blade 22. For example, in one embodiment, the extension portion 66 extends approximately 5% to approximately 50% of the chord 26 of the rotor blade 22. In still further embodiments, the length $L_2$ of the extension portion 66 may extend less than 5% or more than 50% of the chord 26. As shown the illustrated embodiment of FIG. 4, the length $L_2$ is approximately 10% of the chord 26 as measured from the trailing edge 48.

It should be understood that the trailing edge protective cap(s) 60 described herein may be attached to the suction and pressure sides 50, 52 of the rotor blade 22 using any suitable means. For example, in one embodiment, the first and second legs 62, 64 may be attached to the suction and pressure sides 50, 52 via tape, adhesive, fasteners, and/or similar. In an alternative embodiment, the first and second legs 62, 64 may be configured to resiliently engage the suction and pressure sides 50, 52, respectively. Accordingly, the resiliency in the legs 62, 64 effectively holds the trailing edge protective cap 60 to the blade 22.

Figure 6:
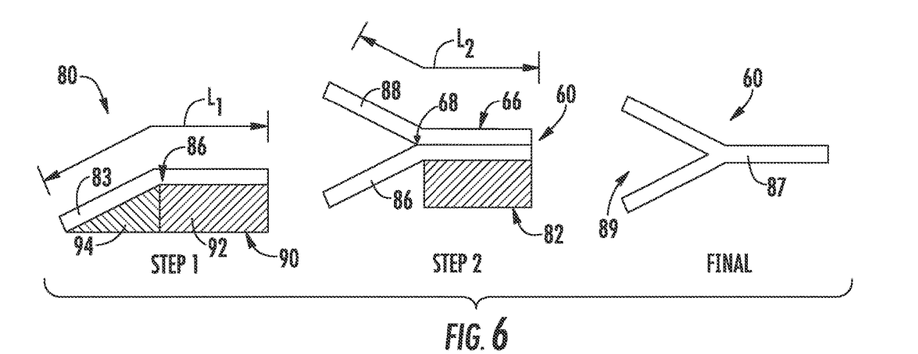

Referring now to FIGS. 5-6, the trailing edge protective cap 60 may be fabricated using any suitable means known in the art. For example, as shown, various embodiments of infusion-molding processes for manufacturing the trailing edge protective cap 60 as described herein are illustrated. Referring particularly to FIG. 5, one embodiment of a process 80 for manufacturing a trailing edge protective cap 60 as described herein is illustrated. As shown, a first step (STEP 1) includes infusing a first material 83 onto a first mold 82 to form a first part 86 having a length $L_1$. For example, the first part 86 of the illustrated embodiment may be formed using a flat mold 82 (e.g. a rectangular mold) such that the first part 86 comprises a rectangular cross-section. While the first part 86 is still in the first mold 82, another step (STEP 2) includes placing a second, angled mold 84 (e.g. a triangular mold) onto the first part 86. More specifically, in one embodiment, the method may include aligning a maximum height $H_{MAX}$ of the second, angled mold 84 with an end 81 of the first mold 82, wherein a height of the angled mold tapers towards a center C of the first mold 82. A second material 85 may then be infused onto the second mold 88 and a portion of the first part 86 so as to form a second part 88 having a length $L_2$. The first and second parts 86, 88 may then be joined together by infusion, plastic-welding, or similar along a portion of their respective lengths $L_1$, $L_2$ so as to form a single-piece cap 60 (FINAL). The resulting trailing edge protective cap has a joined section 87 and an open section 89. In one embodiment, as shown, the joined section 87 and the open section 89 has a Y-shaped cross-section. Such a process provides a trailing edge protective cap 60 suitable for rotor blades 22 requiring an extension member 66 that aligns with a specific shell side, e.g. the pressure side 50 or the suction side 52, when installed on the rotor blade 22.

Referring now to FIG. 6, another embodiment of a process for manufacturing a trailing edge protective cap 60 as described herein is illustrated. As shown, in one embodiment, a first step (STEP 1) includes infusing a first material 83 onto a mold 90 using an infusion-molding process so as to form a first part 86 having a length $L_1$. In addition, as shown, the mold 90 may include a flat section 92 and an angled section 94. More specifically, the mold 90 may include a rectangular mold 92 and triangular mold 94 so as to form a first part 86 having a length $L_1$ with a flat section and an angled section. Another step (not shown) includes forming a substantially identical, but oppositely angled second part 88 having a length $L_2$ to join with the first part 86. In one embodiment, for example, the method may also include removing the first part 86 from the mold 90 and then infusing the second material 88 onto the mold 90 to form the second part 88. Thus, the same mold 90 may be utilized to make the first and second parts 86, 88 having opposite, diverging angles as the angled section 94 of the mold 90 can be detached and moved to the opposite side of the rectangular mold 92 to make a corresponding part. Alternatively, multiples molds 90 may be utilized to form the first and second parts 86, 88 at the same time. A further step (STEP 2) includes joining or infusing the first and second parts 86, 88 together along a portion of their respective lengths $L_1$, $L_2$. The resulting trailing edge protective cap 60 has a joined section 87 and an open section 89 (FINAL). In one embodiment, as shown, the joined section 87 and the open section 89 has a Y-shaped cross-section. Such a process provides a trailing edge protective cap 60 suitable for rotor blades 22 requiring an extension member 66 that aligns with a chord-line, i.e. an imaginary line that connects the leading edge 46 to the trailing edge 48 when installed on the rotor blade 22.

In additional embodiments, the trailing edge protective cap(s) 60 may be formed from any suitable materials that may be utilized in the manufacturing processes described herein. More specifically, the trailing edge protective cap 60 may be any plastic or composite material or a combination thereof, e.g. a fiberglass-reinforced plastic or similar. As such, the trailing edge protective cap 60 may be very lightweight and have a high strength/stiffness. Further, the material of the trailing edge protective cap 60 may have the desired strength, stiffness, and mass to maintain the necessary engagement with the pressure and suction sides 50, 52 without providing additional loading to or hindering aerodynamic performance of the rotor blade 22. Moreover, the trailing edge protective cap 60 may provide improved protection of the trailing edge 48 throughout the range of anticipated loading scenarios generally associated with wind turbine operation. Of course, it should be appreciated that various other suitable materials may be used to form the trailing edge protective cap 60 of the present subject matter and those described herein are not meant to be limit the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a trailing edge protective cap for a rotor blade of a wind turbine, the method comprising:

infusing a first resin material onto a first mold so as to form a first molded part comprising a length;

while still in the first mold, placing a separate, second mold onto at least a portion of the first molded part;

infusing a second resin material onto the second mold and a portion of the first molded part so as to form a second molded part comprising a length; and, welding the first and second molded parts together along a portion their respective lengths so as to form the protective cap, wherein the protective cap comprises a joined section and an open section, the open section comprising a first leg and a second leg extending at opposite, diverging angles from an apex, the joined section forming a flat extension member comprising a length that extends from the apex beyond a trailing edge of the rotor blade so as to define an extended trailing edge, the extension member comprising a uniform thickness from the apex to the extended trailing edge along an entire span of the extended trailing edge.

2. The method of claim 1, wherein the first leg is configured to engage a pressure side of the rotor blade and the second leg is configured to engage a suction side of the rotor blade, wherein the open section is configured to protect the trailing edge of the rotor blade when installed on the rotor blade.

3. The method of claim 2, wherein the extension member extends in a direction that generally aligns with one of the pressure side or suction side of the rotor blade.

4. The method of claim 3, wherein the extension member comprises a solid cross-section along its length.

5. The method of claim 1, wherein the first mold comprises a flat mold, the flat mold comprising a rectangular cross-section.

6. The method of claim 1, wherein the second mold comprises an angled mold, the angled mold comprising a triangular cross-section.

7. The method of claim 6, further comprising aligning a maximum height of the second, angled mold with an end of the first mold, wherein a height of the angled mold tapers towards a center of the first mold.

8. The method of claim 1, wherein the joined section and the open section of the trailing edge protective cap comprise a Y-shaped cross-section.

9. The method of claim 1, wherein welding the first and second molded parts together along a portion of their respective lengths further comprises plastic-welding the first and second molded parts together.

\* \* \* \* \*